(12) United States Patent
Sato et al.

(10) Patent No.: US 11,010,973 B2
(45) Date of Patent: May 18, 2021

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Tadaaki Sato, Kanagawa (JP); Seiya Inagi, Kanagawa (JP); Kazunari Hashimoto, Kanagawa (JP); Hidetaka Izumo, Kanagawa (JP); Yusuke Yamaura, Kanagawa (JP); Daisuke Yasuoka, Kanagawa (JP); Teppei Aoki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 459 days.

(21) Appl. No.: 15/913,123

(22) Filed: Mar. 6, 2018

(65) Prior Publication Data

US 2019/0088017 A1     Mar. 21, 2019

(30) Foreign Application Priority Data

Sep. 20, 2017    (JP) .............................. JP2017-180371

(51) Int. Cl.
*G06T 19/00* (2011.01)
*G06T 7/70* (2017.01)
*G06K 9/00* (2006.01)

(52) U.S. Cl.
CPC ........ *G06T 19/006* (2013.01); *G06K 9/00671* (2013.01); *G06T 7/70* (2017.01); *G06T 2207/10004* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 2002/0054316 A1* | 5/2002 | Abe | ...................... | G06F 3/1229 358/1.14 |
| 2004/0223185 A1* | 11/2004 | Yamada | .......... | H04N 5/232933 358/1.15 |
| 2005/0237566 A1* | 10/2005 | Sakuda | .............. | H04N 1/00347 358/1.15 |
| 2006/0017950 A1* | 1/2006 | Ikegami | ................. | G06Q 10/06 358/1.13 |
| 2011/0229039 A1* | 9/2011 | Kitada | ............... | G06K 9/00174 382/187 |
| 2014/0160157 A1* | 6/2014 | Poulos | .................... | G06F 3/011 345/633 |

(Continued)

FOREIGN PATENT DOCUMENTS

JP    2004-227462 A    8/2004

*Primary Examiner* — Martin Mushambo
(74) *Attorney, Agent, or Firm* — Oliff PLC

(57) ABSTRACT

An information processing apparatus includes an acquiring unit and a command unit. The acquiring unit acquires positional information of a container containing a contained object from an image acquired as a result of photographing the container by using a display device that displays a virtual-space image and a real space in an overlapping manner and that has a photographing function. The command unit commands the display device to display information related to the contained object stored in association with the positional information as the virtual-space image near the container.

15 Claims, 14 Drawing Sheets

(56) References Cited

U.S. PATENT DOCUMENTS

2015/0003680 A1* 1/2015 Umeda .............. G06K 9/00677
                                                        382/103
2017/0331924 A1* 11/2017 Katori ..................... H04L 67/18
2018/0047295 A1* 2/2018 Ricci .................... G05D 1/0027

* cited by examiner

| USER ID | USERNAME | DEPARTMENT | USER DESCRIPTION |
|---|---|---|---|
| user001 | A | DESIGN DEPARTMENT | FULL-TIME (EXECUTIVE) |
| user002 | B | INTELLECTUAL PROPERTY DEPARTMENT | FULL-TIME (GENERAL) |
| user003 | C | TECHNICAL DEPARTMENT | TEMPORARY |
| ... | ... | ... | ... |

| CABINET ID | POSITIONAL INFORMATION | FILE ID | FILE NAME | CREATED TIME | UPDATED TIME |
|---|---|---|---|---|---|
| C001 | ... | F001 | DIRECTORY | 01/11/2016 09:38 | 03/31/2016 17:06 |
| | | F002 | ORGANIZATION CHART | ... | ... |
| C002 | ... | ... | ... | ... | ... |
| ... | | ... | ... | ... | ... |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-180371 filed Sep. 20, 2017.

BACKGROUND

Technical Field

The present invention relates to information processing apparatuses, information processing systems, and non-transitory computer readable media.

SUMMARY

According to an aspect of the invention, there is provided an information processing apparatus including an acquiring unit and a command unit. The acquiring unit acquires positional information of a container containing a contained object from an image acquired as a result of photographing the container by using a display device that displays a virtual-space image and a real space in an overlapping manner and that has a photographing function. The command unit commands the display device to display information related to the contained object stored in association with the positional information as the virtual-space image near the container.

BRIEF DESCRIPTION OF THE DRAWINGS

Exemplary embodiments of the present invention will be described in detail based on the following figures, wherein:

FIG. 5 illustrates an example of a user attribute table;

FIG. 6 illustrates an example of a cabinet table;

DETAILED DESCRIPTION

Figure 1:
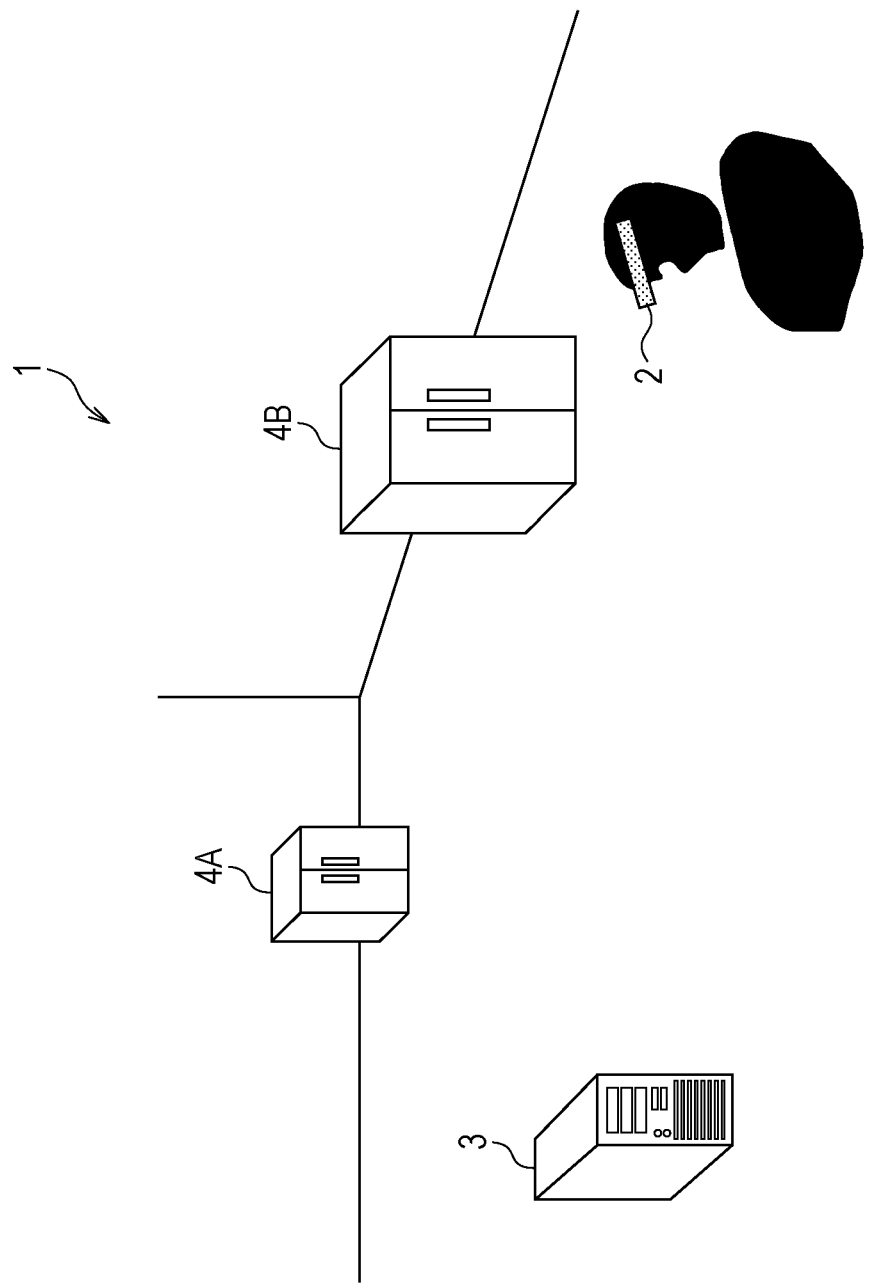
FIG. 1 illustrates a configuration example of an information processing system according to a first exemplary embodiment of the present invention.

Exemplary embodiments of the present invention will be described below with reference to the drawings. In the drawings, components having substantially identical functions are given the same reference signs, and redundant descriptions thereof will be omitted.

An information processing apparatus according to an exemplary embodiment includes an acquiring unit and a command unit. The acquiring unit acquires positional information of a container containing a contained object from an image acquired as a result of photographing the container by using a display device that displays a virtual-space image and a real space in an overlapping manner and that has a photographing function. The command unit commands the display device to display information related to the contained object stored in association with the positional information as the virtual-space image near the container.

The term "display device" includes a light-transmissive head-mounted display device that is to be worn on a head of a user and through which the user is capable of directly viewing a real space (background) simultaneously with presented information as a virtual-space image, as well as a portable information terminal that displays presented information as a virtual-space image on a photographed image of the background in an overlapping manner. The light-transmissive head-mounted display device may be in the form of goggles or eyeglasses. The portable information terminal may be of a head-mounted type.

First Exemplary Embodiment

FIG. 1 illustrates a configuration example of an information processing system 1 according to a first exemplary embodiment of the present invention.

The information processing system 1 includes a head-mounted display device (referred to as "HMD device" hereinafter) 2 and an information processing apparatus 3 that controls the HMD device 2. The HMD device 2 and the information processing apparatus 3 are wirelessly connected to each other in a communicable manner. Although a single HMD device 2 is illustrated in FIG. 1, multiple HMD devices 2 may be provided. The HMD device 2 is an example of a display device.

The information processing system 1 may be used in, for example, an office or a public facility. FIG. 1 illustrates a state where multiple cabinets 4A and 4B (which may collectively be referred to as "cabinets 4") are disposed in an office and a person wearing the HMD device 2 is viewing toward the cabinets 4. Although two cabinets 4 are illustrated in FIG. 1, a single cabinet 4 or three or more cabinets 4 may be provided. Each cabinet 4 is an example of a container.

The HMD device 2 is configured to virtually display a so-called virtual image by displaying a virtual-space image (referred to as "virtual image" hereinafter) and the real space (background) in an overlapping manner. Specifically, the HMD device 2 is a light-transmissive head-mounted display device that is to be worn on the head of a user and through which the user is capable of directly viewing the background simultaneously with the virtual image.

The information processing apparatus 3 manages files 5 (see FIG. 4) contained in the cabinets 4 on a cabinet 4 by cabinet 4 basis and provides information related to each file 5 to the user using the HMD device 2.

Although each cabinet 4 is provided with a lockable door in this exemplary embodiment, each cabinet may be of a type not provided with a door. Of the multiple cabinets 4, for example, a cabinet 4 that contains an object of importance may be unlocked at a specific time (e.g., 8:00 AM) set by a manager and may be locked at a specific time (e.g., 6:00 PM) set by the manager. Alternatively, all of the cabinets 4 may be unlocked and locked by the manager or do not have to be unlocked and locked.

Each file 5 binds a document and is an example of a contained object. A contained object to be contained in each container is not limited to a file 5 and may alternatively be shared equipment, such as a camera, a personal computer, or a portable terminal, in a company, a department, or a group.

Figure 2:
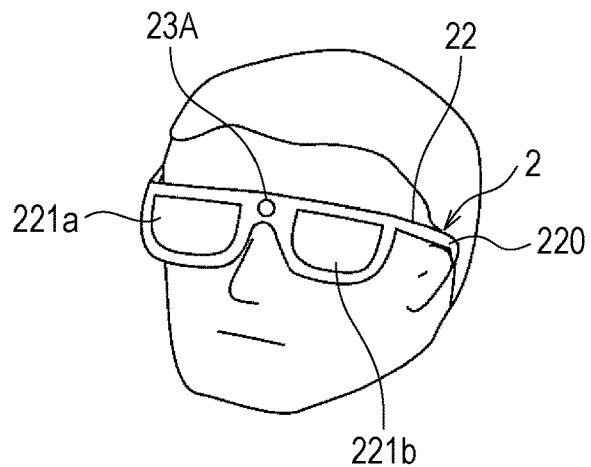
FIG. 2 is an external view illustrating an example of a head-mounted display device.
Figure 3:
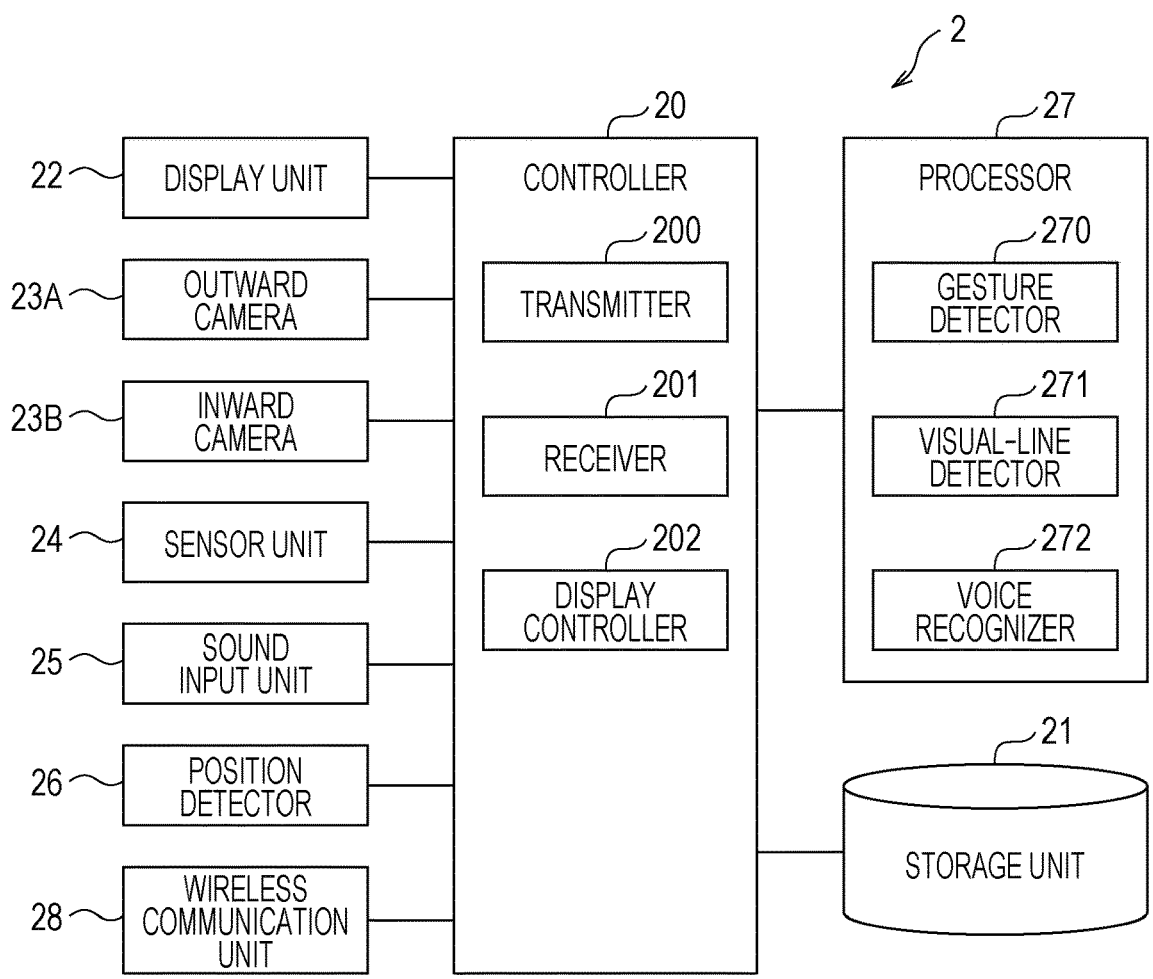
FIG. 3 illustrates an example of a control system of the head-mounted display device.

FIG. 2 is an external view illustrating an example of the HMD device 2. The HMD device 2 includes a display unit 22 and an outward camera 23A. The display unit 22 includes a frame 220 to be mounted to the ears, and also includes a right transmissive display 221a and a left transmissive display 221b (sometimes collectively referred to as "transmissive displays 221").

The transmissive displays 221 may be, for example, transmissive liquid-crystal displays, transmissive organic electroluminescence (EL) displays, or transmissive inorganic EL displays. The right transmissive display 221a displays a display image for the right eye, and the left transmissive display 221b displays a display image for the left eye. The right-eye display image and the left-eye display image are overlapped with the background and are visually recognized as a virtual image by the user using the HMD device 2.

Configuration of HMD Device

FIG. 2 illustrates an example of a control system of the HMD device 2. The HMD device 2 includes a controller 20 that controls each component of the HMD device 2, a storage unit 21 that stores various types of information, the aforementioned display unit 22, the aforementioned outward camera 23A, an inward camera 23B, a sensor unit 24, a sound input unit 25, a position detector 26, a processor 27, and a wireless communication unit 28.

The controller 20 is constituted of, for example, a central processing unit (CPU) and an interface. The CPU operates in accordance with a program 210 stored in the storage unit 21 so as to function as, for example, a transmitter 200, a receiver 201, and a display controller 202. The components 200 to 202 will be described in detail later.

The storage unit 21 is constituted of, for example, a read-only memory (ROM), a random access memory (RAM), and a hard disk and stores therein, for example, programs and data.

The outward camera 23A photographs the background as well as a hand of the user using the HMD device 2, and transmits the photographed image to the controller 20. The inward camera 23B photographs the eyes of the user using the HMD device 2 and transmits the photographed image to the controller 20. The images to be photographed by the outward camera 23A and the inward camera 23B may be still images or moving images. In a case where a gesture is to be detected by photographing the hand of the user or a visual line is to be detected, a moving image is desirable or continuous still images obtained by photographing multiple images per second are desirable.

The sensor unit 24 includes a distance image sensor, an acceleration sensor, and a gyroscope. The distance image sensor may be, for example, an infrared distance sensor, a laser distance sensor, or an ultrasonic distance sensor. The distance image sensor radiates infrared light, laser light, or an ultrasonic wave and reads the distance for each pixel from the time difference of the reflection thereof so as to obtain a distance image. The acceleration sensor detects acceleration applied to the HMD device 2. The gyroscope detects an angular speed applied to the HMD device 2.

The sound input unit 25 is constituted of a microphone and converts a voice output by the user using the HMD device 2 into a voice signal, which is an electric signal, and receives the voice signal.

The processor 27 processes information input by the outward camera 23A, the inward camera 23B, the sensor unit 24, and the sound input unit 25 and includes a gesture detector 270, a visual-line detector 271, and a voice recognizer 272.

The gesture detector 270 detects a gesture that indicates movement of the user using the HMD device 2. Specifically, the gesture detector 270 detects a predetermined hand gesture in accordance with movement of the user's hand (e.g., a two-finger pinching operation) from the distance image detected by the distance image sensor of the sensor unit 24. Furthermore, the gesture detector 270 detects a predetermined head gesture in accordance with movement of the user's head (e.g., sideways shaking of the head) based on the acceleration of the HMD device 2 detected by the acceleration sensor of the sensor unit 24 and the angular speed of the HMD device 2 detected by the gyroscope. The gesture detector 270 transmits a command corresponding to the detected gesture to the controller 20.

The visual-line detector 271 detects the visual-line direction of the user from an image of the user's eyes photographed by the inward camera 23B, and transmits the detected visual-line direction and a command corresponding to the visual-line direction to the controller 20. The method of detecting the visual line may involve, for example, using a visible-light camera as the inward camera 23B to detect the visual line based on the position of the iris relative to the position of the inner corner of an eye or using an infrared camera and an infrared light emitting diode as the inward camera 23B to detect the visual-line direction based on the position of the pupil relative to the position of corneal reflex. The visual-line direction may be used in place of a gesture.

The voice recognizer 272 converts the voice signal received by the sound input unit 25 into digital voice data and transmits the voice data to the controller 20.

The wireless communication unit 28 communicates with the information processing apparatus 3 by using near field communication, such as Wi-Fi (Wireless Fidelity), a wireless local area network (LAN), such as Wi-Fi Direct, Bluetooth (registered trademark), or infrared communication. The wireless communication unit 28 may be used for communication between HMD devices 2.

The position detector 26 regularly detects positional information indicating the position of the HMD device 2 by using a global positioning system (GPS), and transmits the detected positional information to the controller 20. Alternatively, the position of the HMD device 2 may be detected by using a beacon signal. Specifically, the position detector 26 detects a beacon signal containing a beacon ID for identifying a beacon transmitter, and transmits the beacon ID and intensity information about the beacon signal to the information processing apparatus 3. The information processing apparatus 3 acquires positional information of the HMD device 2 from positional information of the beacon transmitter corresponding to the beacon ID and from the intensity of the beacon signal.

Next, the components 200 to 202 of the HMD device 2 will be described.

The transmitter 200 transmits the image photographed by the outward camera 23A, the processing result obtained by the processor 27 (e.g., the command corresponding to the gesture detected by the gesture detector 270, the visual-line direction detected by the visual-line detector 271 and the command corresponding to the visual-line direction, or the voice data recognized by the voice recognizer 272), or the positional information detected by the position detector 26 to the information processing apparatus 3 via the wireless communication unit 28 together with a user ID for identifying the user using the HMD device 2.

The receiver 201 receives a display image transmitted from a transmitter 304 of the information processing apparatus 3 and positional information indicating a position at which the display image is to be visually recognized as a virtual image.

The display controller 202 controls the display unit 22 based on the display image and the positional information received by the receiver 201. Specifically, the display controller 202 performs control to generate a right-eye display image and a left-eye display image based on the display image and the positional information received by the receiver 201, cause the right transmissive display 221a to display the right-eye display image, and cause the left transmissive display 221b to display the left-eye display image, so that the user using the HMD device 2 visually recognizes the virtual image at the position corresponding to the positional information.

Configuration of Information Processing Apparatus

Figure 4:
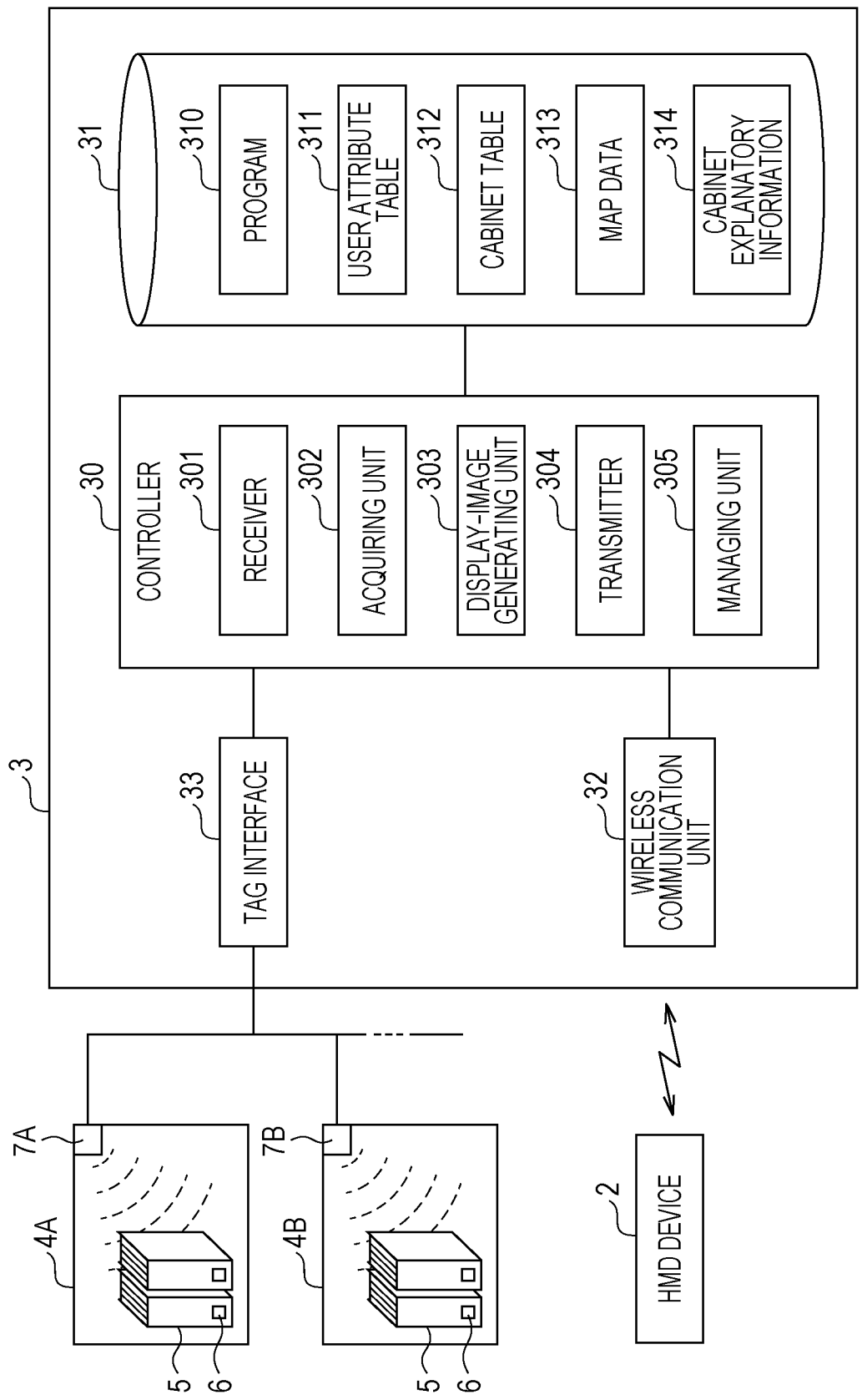
FIG. 4 is a block diagram illustrating an example of a control system of an information processing apparatus.

FIG. 4 is a block diagram illustrating an example of a control system of the information processing apparatus 3. The information processing apparatus 3 includes a controller 30 that controls each component of the information processing apparatus 3, a storage unit 31 that stores various types of information, a wireless communication unit 32 that wirelessly communicates with each HMD device 2, and a tag interface 33.

The controller 30 is constituted of, for example, a central processing unit (CPU) and an interface. The CPU operates in accordance with a program 310 so as to function as, for example, a receiver 301, an acquiring unit 302, a display-image generating unit 303, a transmitter 304, and a managing unit 305. The display-image generating unit 303 and the transmitter 304 are an example of a command unit. The components 301 to 305 will be described in detail later.

The storage unit 31 is constituted of, for example, a read-only memory (ROM), a random access memory (RAM), and a hard disk and stores therein, for example, the program 310, a user attribute table 311 (see FIG. 5), a cabinet table 312 (see FIG. 6), map data 313, and cabinet explanatory information 314. In this description, the term "record" or "registered" is used when writing information into a table, and the term "store" is used when writing information into a storage unit. The cabinet explanatory information 314 is an example of information related to a contained object.

The map data 313 contains a three-dimensional figure in a building or room where the cabinets 4 are disposed, and also contains positional information that is associated with a cabinet ID for identifying each cabinet 4 and that indicates a three-dimensional position of each cabinet 4 disposed in the building or room. The three-dimensional figure is to be compared with an image of each cabinet 4 photographed by the outward camera 23A of the HMD device 2.

The wireless communication unit 32 communicates with the HMD device 2 by using near field communication, such as Wi-Fi (Wireless Fidelity), a wireless local area network (LAN), such as Wi-Fi Direct, Bluetooth (registered trademark), or infrared communication.

The tag interface 33 is connected to tag readers 7A and 7B (which may collectively be referred to as "tag readers 7") respectively provided in the cabinets 4A and 4B. The files 5 are individually provided with integrated-circuit (IC) tags 6. Each IC tag 6 stores a file ID in a memory for identifying the file.

Configuration of User Attribute Table

FIG. 5 illustrates an example of the user attribute table 311. The user attribute table 311 has a "user ID" field in which a user ID is recorded, a "username" field in which a username is recorded, a "department" field in which a department to which a user belongs is recorded, and a "user description" field in which a description of whether a user is a full-time employee or a temporary employee and whether a user is an executive officer or a general officer is recorded. The user ID, the username, the department, and the user description are an example of attribute information of a person. The department is an example of a group.

Configuration of Cabinet Table

FIG. 6 illustrates an example of the cabinet table 312. The cabinet table 312 has a "cabinet ID" field in which a cabinet ID for identifying a cabinet is recorded, a "positional information" field in which positional information indicating the position of each cabinet 4 is recorded, a "file ID" field in which a file ID for identifying each file 5 contained in the corresponding cabinet 4 is recorded, a "file name" field in which a file name is recorded, a "created time" field in which the time and date of creation of each file 5 are recorded, and an "updated time" field in which the updated time and date of each file 5 are recorded.

Hierarchical Structure of Cabinet Explanatory Information

Figure 7:
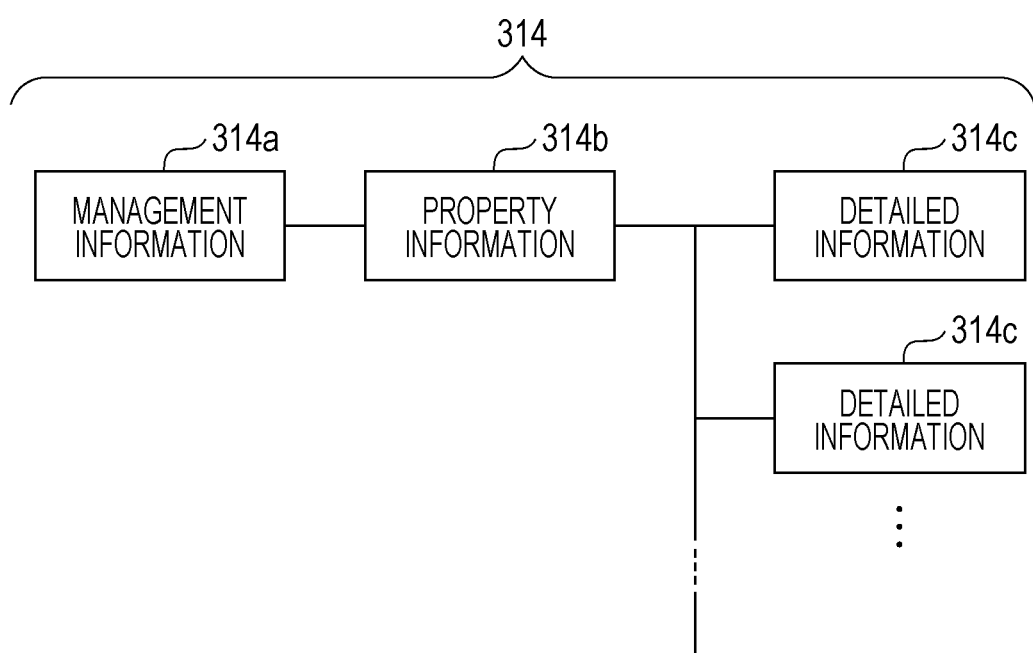
FIG. 7 illustrates an example of a hierarchical structure of cabinet explanatory information.

FIG. 7 illustrates an example of a hierarchical structure of the cabinet explanatory information 314. The cabinet explanatory information 314 explains the outline of each file 5 contained in the corresponding cabinet 4. Specifically, the cabinet explanatory information 314 is constituted of multiple pieces of information in the hierarchical structure and is stored in the storage unit 31 in association with each cabinet ID. For example, the cabinet explanatory information 314 includes management information 314a (see FIG. 8) related to management of each cabinet 4, property information 314b (FIG. 9) about the files 5 contained in the cabinet 4, and detailed information 314c (FIG. 10) about items constituting the property information 314b. The management information 314a, the property information 314b, and the detailed information 314c are located at the upper layer, the intermediate layer, and the lower layer, respectively, of the hierarchical structure. The detailed information 314c is an example of attribute information of selected information.

Next, the components 301 to 305 of the information processing apparatus 3 will be described.

The receiver 301 receives, for example, a user ID, an image, voice data, positional information of the HMD device 2, and various types of commands transmitted from the HMD device 2.

When the receiver 301 receives a command indicating a log-in request, positional information of the HMD device 2, an image of a cabinet 4, and a user ID, the acquiring unit 302 acquires positional information of the cabinet 4 and the cabinet ID thereof based on the positional information of the HMD device 2, the image of the cabinet 4, and the map data 313. Furthermore, the acquiring unit 302 calculates the distance from the HMD device 2 to the cabinet 4 based on the positional information of the HMD device 2 and the positional information of the cabinet 4. If the image includes multiple cabinets 4, the acquiring unit 302 calculates the distance to each cabinet 4.

Alternatively, the surface of each cabinet 4 may be provided with a code image, such as a Quick Response (QR) code (registered trademark) in which the positional information of the cabinet 4 and the cabinet ID thereof are encrypted. In this case, the acquiring unit 302 may decrypt the code image and the cabinet ID included in the image photographed by the outward camera 23A of the HMD device 2 so as to acquire the positional information and the cabinet ID of the cabinet 4.

The display-image generating unit 303 generates a display image to be displayed on the display unit 22 of the HMD device 2, such as a display image including the cabinet explanatory information 314 according to the distance from the HMD device 2 to the cabinet 4. Specifically, the display-image generating unit 303 generates a display image by changing the text size of the cabinet explanatory information 314 such that the text size is larger for the cabinet 4 with the longer distance to the HMD device 2 than for the cabinet 4 with the shorter distance to the HMD device 2. In a case where the text size is not changed, the text of the cabinet explanatory information 314 displayed as a virtual image appears to be small as the distance from the HMD device 2 to the cabinet 4 increases. In contrast, this exemplary embodiment may prevent the text from appearing to be small.

The transmitter 304 commands the HMD device 2 to display the generated display image as a virtual image. Specifically, the transmitter 304 transmits the display image generated by the display-image generating unit 303 and positional information (e.g., near the corresponding cabinet 4) where the display image is to be visually recognized as a virtual image to the HMD device 2 and commands the HMD device 2 to display the display image as a virtual image near the cabinet 4. The positional information of the virtual image may be the front surface of the cabinet 4.

When a file 5 is fetched from the cabinet 4 and the tag reader 7 is no longer able to read information from the IC tag 6, the managing unit 305 determines that the file 5 has been fetched from the cabinet 4. When the file 5 is returned to the cabinet 4 and the tag reader 7 is able to read information from the IC tag 6, the managing unit 305 determines that the file 5 has been returned to the cabinet 4.

Operation of First Exemplary Embodiment

Next, an example of operation of the information processing system 1 will be described with reference to FIGS. 7 to 10 in accordance with a flowchart in FIG. 11.

1. Log-In

For example, when the user using the HMD device 2 moves his/her hand to perform a gesture (first gesture) for making a command for photographing the cabinets 4, the gesture detector 270 of the HMD device 2 detects the first gesture from a distance image acquired by the distance image sensor of the sensor unit 24 and transmits a first command corresponding to the first gesture to the controller 20.

Based on the first command from the gesture detector 270, the controller 20 controls the outward camera 23A so as to photograph the cabinets 4. The controller 20 stores the photographed image into the storage unit 21 together with positional information detected by the position detector 26 when the image is photographed.

Subsequently, when the user using the HMD device 2 moves his/her hand to perform a gesture (second gesture) for making a log-in command, the gesture detector 270 of the HMD device 2 detects the second gesture from the distance image acquired by the distance image sensor of the sensor unit 24 and transmits a second command corresponding to the second gesture to the controller 20.

The transmitter 200 of the HMD device 2 transmits a log-in request to the information processing apparatus 3 together with the image, the positional information of the HMD device 2, and the user ID for identifying the user using the HMD device 2.

The receiver 301 of the information processing apparatus 3 receives the log-in request, the image, the positional information of the HMD device 2, and the user ID transmitted from the HMD device 2 (Yes in step S1).

2. Acquisition of Positional Information of Cabinet

From the image and the positional information of the HMD device 2 received by the receiver 301 and also from the map data 313, the acquiring unit 302 acquires positional information and a cabinet ID of each cabinet 4 included in the image. Furthermore, based on the positional information of the HMD device 2 and the positional information of the cabinet 4, the distance from the HMD device 2 to the cabinet 4 is calculated (step S2). In a case shown in FIG. 8 to be described later, a distance $L_1$ to the cabinet 4A and a distance $L_2$ to the cabinet 4B are calculated.

3. Generation of Display Image

Based on the cabinet ID acquired by the acquiring unit 302 and the distance from the HMD device 2 to the cabinet 4 calculated by the acquiring unit 302, the display-image generating unit 303 generates a display image (step S3). Specifically, the display-image generating unit 303 reads the upper-layer management information 314a of the cabinet explanatory information 314 corresponding to the cabinet ID from the storage unit 31 and generates the display image by changing the text size in accordance with the distance from the HMD device 2 to the cabinet 4.

4. Transmission of Display Image and Positional Information

The transmitter 304 transmits the display image generated by the display-image generating unit 303 and the positional information of the cabinet 4 acquired by the acquiring unit 302 to the HMD device 2 (step S4).

The display controller 202 of the HMD device 2 controls the display unit 22 based on the display image and the positional information such that the display image is visually recognized as a virtual image near the cabinet 4.

Figure 8:
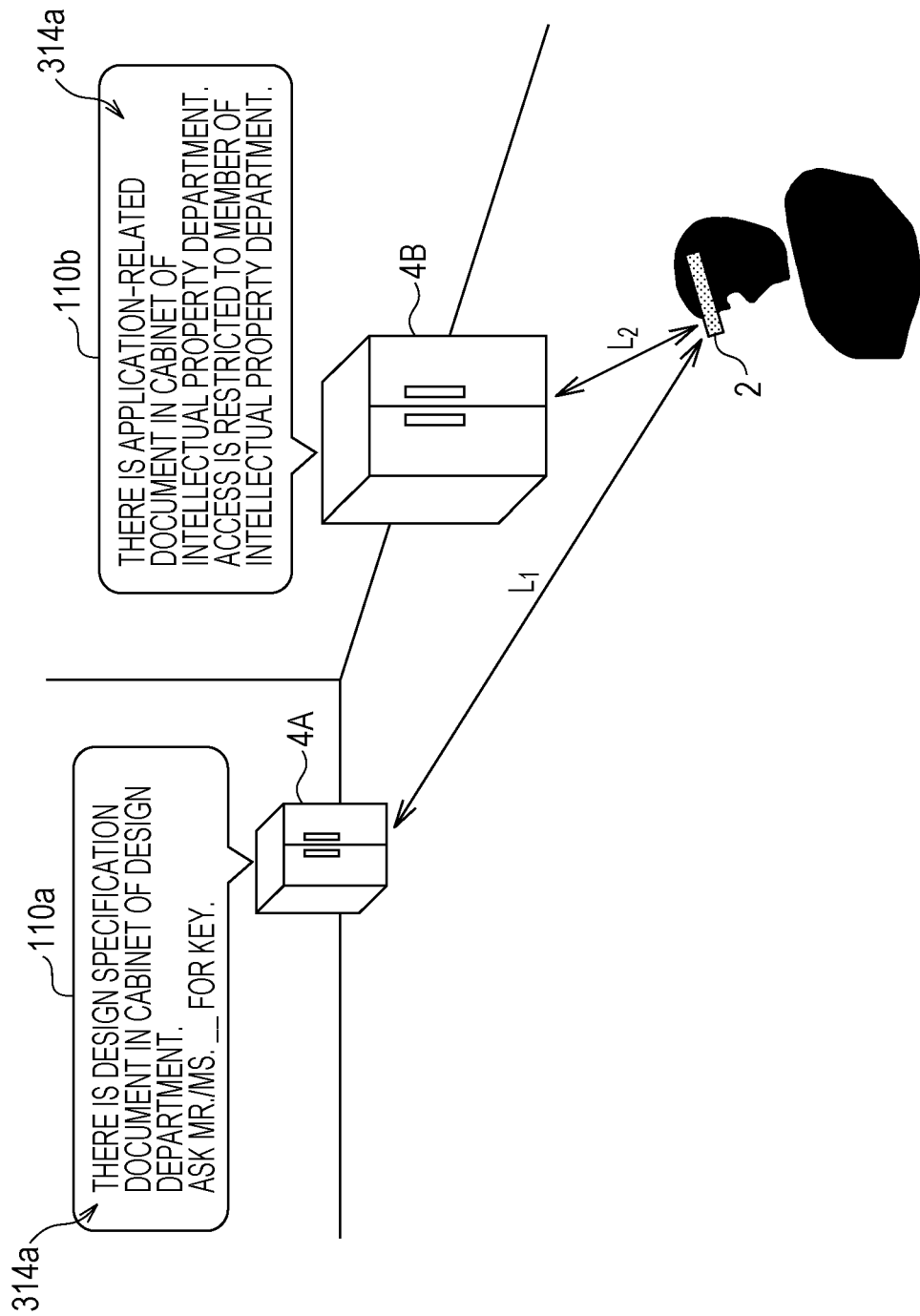
FIG. 8 illustrates a display example of virtual images.

FIG. 8 illustrates a display example of virtual images. For example, virtual images 110a and 110b shown in FIG. 8 include departments that use the cabinets 4, the types of files 5 contained in the cabinets 4, and management information 314a, such as access-related information. The access-related information includes a key manager, a person given an access right, and so on. Each of the virtual images 110a and 110b is a two-dimensional image that includes the management information 314a.

Specifically, as shown in FIG. 8, the user using the HMD device 2 visually recognizes the virtual image 110a including the management information 314a that reads "THERE IS DESIGN SPECIFICATION DOCUMENT IN CABINET OF DESIGN DEPARTMENT. ASK MR./MS. ___ FOR KEY." near the far-side cabinet 4A located away from the HMD device 2 by the distance $L_1$. The user also visually recognizes the virtual image 110b including the management information 314a that reads "THERE IS APPLICATION-RELATED DOCUMENT IN CABINET OF INTELLECTUAL PROPERTY DEPARTMENT. ACCESS IS RESTRICTED TO MEMBERS OF INTELLECTUAL PROPERTY DEPARTMENT." near the near-side cabinet 4B located away from the HMD device 2 by the distance $L_2$. The management information 314a is positioned at the upper layer of the hierarchical structure.

Although the text of the management information 314a displayed as a virtual image may appear to be small in reality as the distance from the HMD device 2 to each cabinet 4 increases, the text is prevented from appearing to be small by changing the text size, thereby achieving better readability of the management information 314a, as compared with a case where the text size is not changed.

Alternatively, a virtual image according to the access right given to the user using the HMD device 2 may be displayed. For example, the acquiring unit 302 acquires department information from the user attribute table 311 based on a user ID and acquires a department using a cabinet 4 from the management information 314a of the cabinet explanatory information 314. If the user using the HMD device 2 is an outsider not belonging to the department using the cabinet 4, it is determined that the user does not have an access right to the information so as not to generate a display image or not to display the information as a virtual image. As another alternative, the upper-layer management information 314a alone may be displayed as a virtual image to the outsider, such that the intermediate-layer property information 314b and the lower-layer detailed information 314c are not displayed as a virtual image.

Furthermore, information to be virtually displayed as a virtual image may be changed in accordance with a predetermined time period. For example, the cabinet explanatory information 314 may entirely be accessible during the predetermined time period (e.g., 8:00 AM to 6:00 PM), whereas outsiders are not allowed to access the entire cabinet explanatory information 314 or the property information 314b and the detailed information 314c outside the predetermined time period, meaning that the information is not displayed as a virtual image.

5. Reception of Operation

Figure 9:
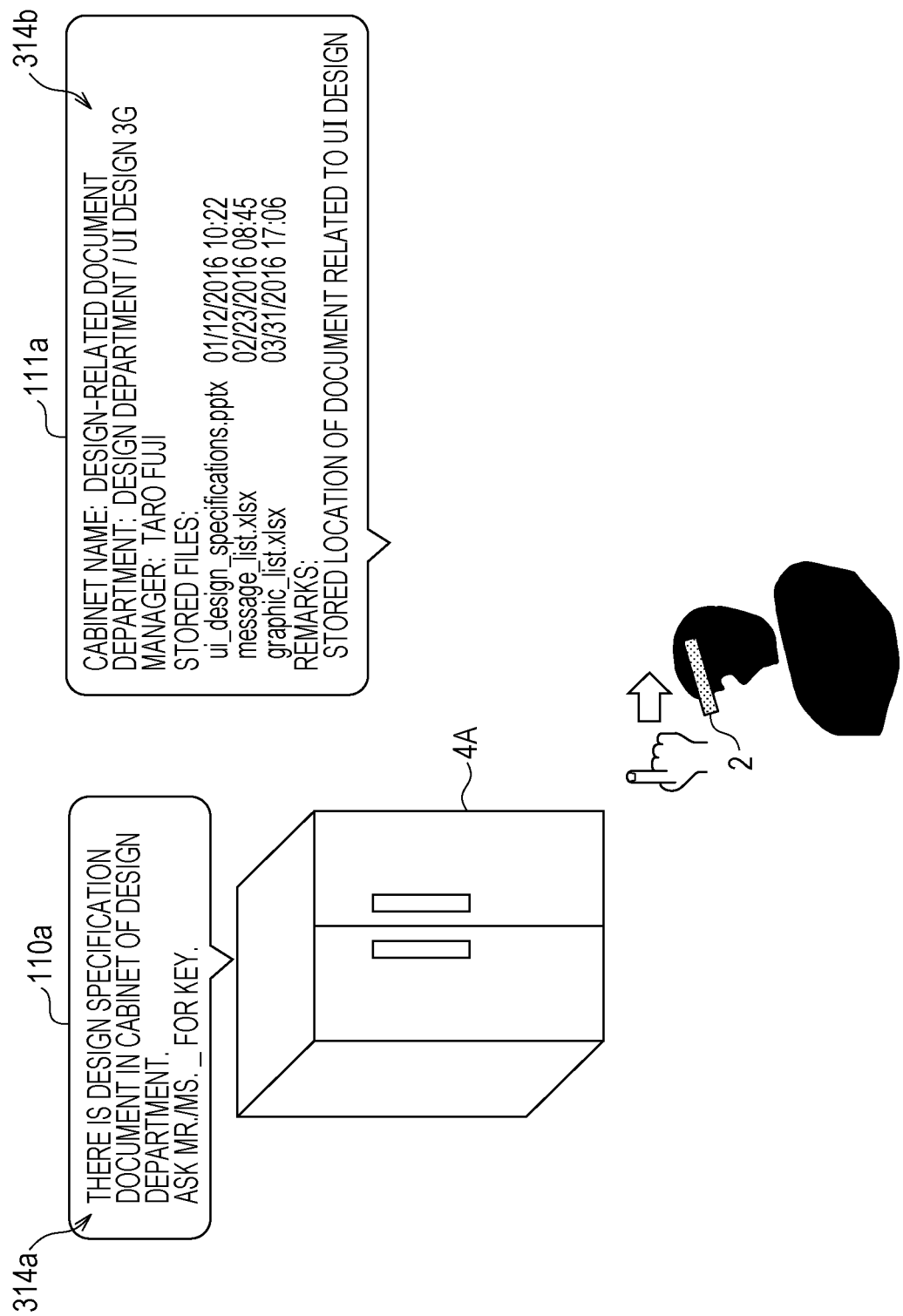
FIG. 9 illustrates a display example of virtual images.

As shown in FIG. 9, when the user using the HMD device 2 moves his/her hand at a position located away from the cabinet 4A relative to the virtual image 110a displayed near the cabinet 4A and performs a gesture (third gesture) for making an intermediate-layer display command, the gesture detector 270 of the HMD device 2 detects the third gesture from a distance image acquired by the distance image sensor of the sensor unit 24 and transmits a third command corresponding to the third gesture to the controller 20.

The transmitter 200 transmits the third command from the gesture detector 270 to the information processing apparatus 3 together with the user ID.

When the receiver 301 of the information processing apparatus 3 receives the third command and the user ID transmitted from the HMD device 2 (step S5), the acquiring unit 302 acquires the intermediate-layer property information 314b of the cabinet explanatory information 314 from the storage unit 31 based on the third command.

The display-image generating unit 303 generates a display image including the property information 314b acquired from the acquiring unit 302 (step S6).

The transmitter 304 transmits the display image generated by the display-image generating unit 303 and positional information of the cabinet 4 acquired by the acquiring unit 302 to the HMD device 2 (step S7).

The display controller 202 of the HMD device 2 controls the display unit 22 based on the display image and the positional information such that the display image is visually recognized as a virtual image near the cabinet 4.

FIG. 9 illustrates a display example of virtual images. A virtual image 111a shown in FIG. 9 includes property information 314b of files 5 contained in the cabinet 4. As shown in FIG. 9, the property information 314b includes, for example, a file name, a data format, and a data created time of each contained file 5. The virtual image 111a is a two-dimensional image that includes the property information 314b. As shown in FIG. 9, the user using the HMD device 2 is able to view the upper-layer management information 314a and the intermediate-layer property information 314b from a position located away from the cabinet 4A.

Figure 10:
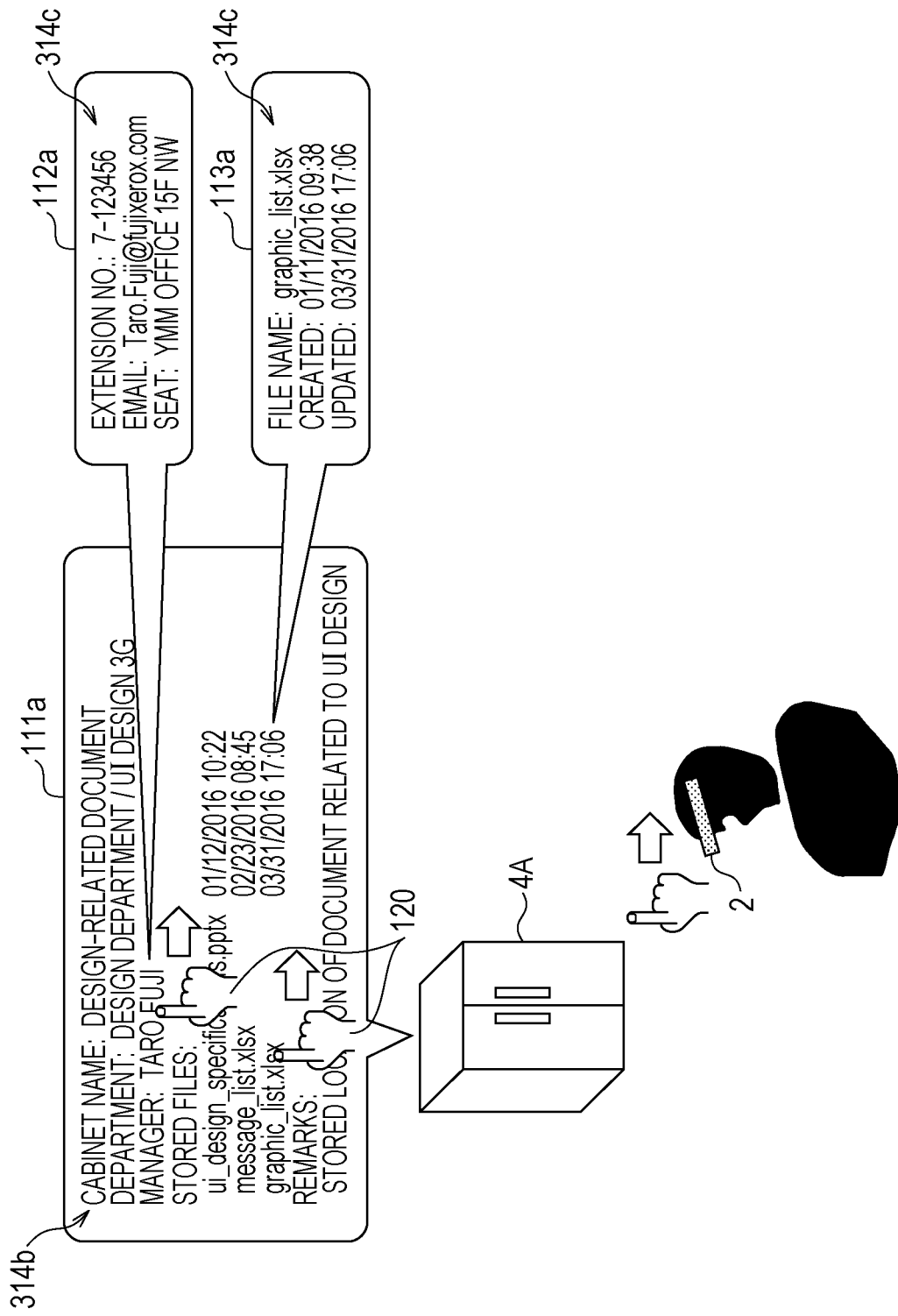
FIG. 10 illustrates a display example of virtual images.
Figure 11:
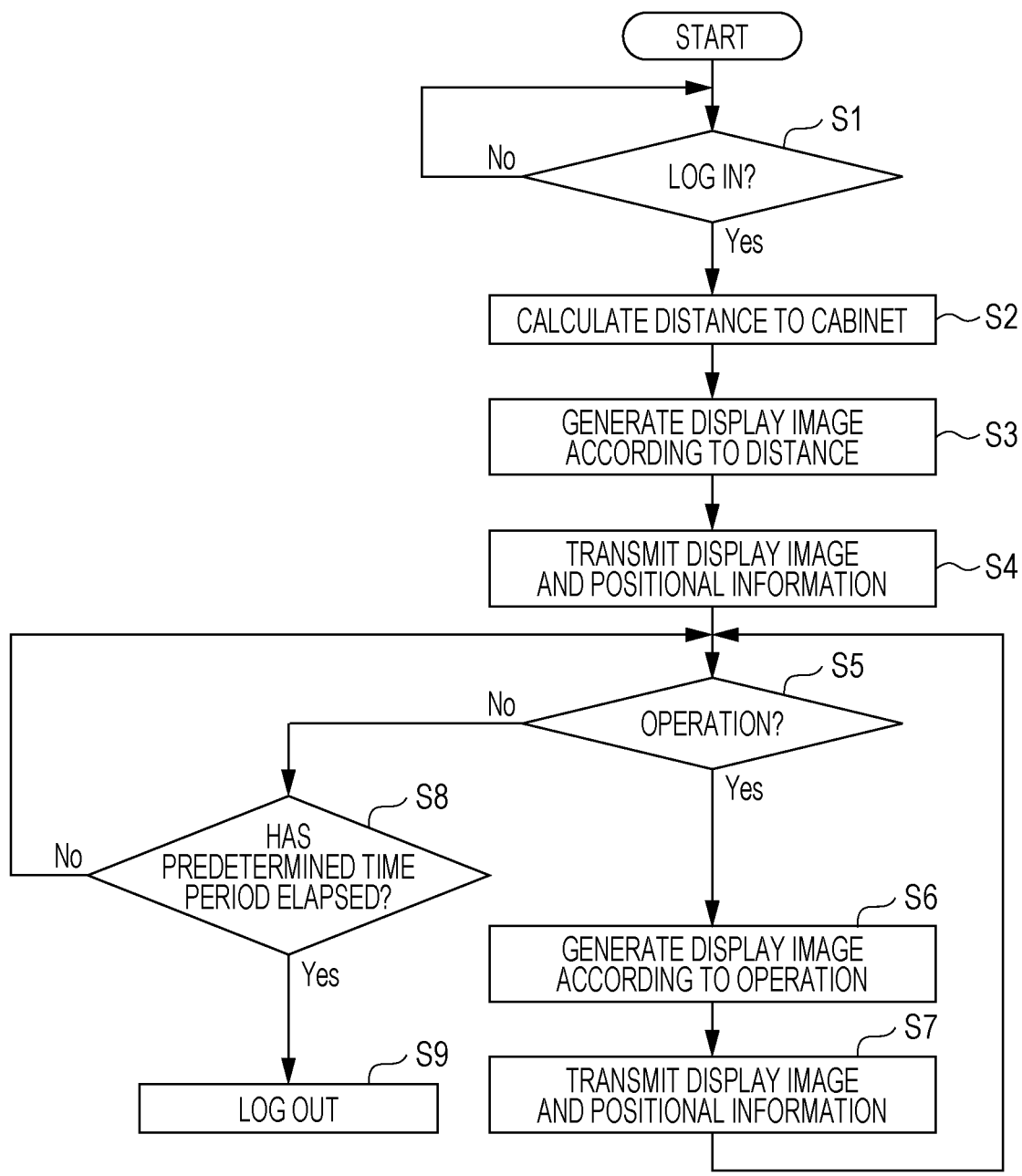
FIG. 11 is a flowchart illustrating an example of operation of the information processing apparatus according to the first exemplary embodiment.

Subsequently, as shown in FIG. 10, when the user using the HMD device 2 moves his/her hand relative to the virtual image 111a displayed near the cabinet 4A and performs a gesture (fourth gesture) for displaying an icon 120 for selecting an item from the property information 314b included in the virtual image 111a and for operating the icon 120, the gesture detector 270 of the HMD device 2 detects the fourth gesture from a distance image acquired by the distance image sensor of the sensor unit 24 and transmits a fourth command corresponding to the fourth gesture and positional information of the item to the controller 20.

The transmitter 200 transmits the fourth command and the positional information of the item from the gesture detector 270 to the information processing apparatus 3 together with the user ID.

When the receiver 301 of the information processing apparatus 3 receives the fourth command, the positional information of the item, and the user ID transmitted from the HMD device 2 (step S5), the acquiring unit 302 acquires the detailed information 314c corresponding to the lower-layer item of the cabinet explanatory information 314 from the storage unit 31 based on the fourth command and the positional information of the item.

The display-image generating unit 303 generates a display image including the detailed information 314c acquired by the acquiring unit 302 (step S6).

The transmitter 304 transmits the display image generated by the display-image generating unit 303 and the positional information of the item acquired by the acquiring unit 302 to the HMD device 2 (step S7).

The display controller 202 of the HMD device 2 controls the display unit 22 based on the display image and the positional information of the item such that the display image is visually recognized as a virtual image near the cabinet 4A.

FIG. 10 illustrates a display example of virtual images. Virtual images 112a and 113a shown in FIG. 10 each include detailed information 314c of an item constituting the property information 314b. When an item corresponding to the name of the manager (e.g., Taro Fuji) is selected from the property information 314b by using the icon 120, the virtual image 112a including the detailed information 314c (i.e., contact information of Taro Fuji) is virtually displayed. When an item corresponding to a graphic list is selected from the property information 314b by using the icon 120, the virtual image 113a including the detailed information 314c about the graphic list (e.g., created time and updated time) is virtually displayed. The detailed information 314c is located at the lower layer of the property information 314b. Each of the virtual images 112a and 113a is a two-dimensional image that includes the detailed information 314c. By making the items selectable using the icon 120, the property information 314b and the detailed information 314c may be viewed from a position located away from the cabinet 4A.

If a command indicating an operation is not received after a predetermined time period in step S5 described above (Yes in step S8), a forced log-out process from the HMD device 2 is performed (step S9). Alternatively, the log-out process may be performed based on a log-out request from the user using the HMD device 2.

Another Display Example of Virtual Images

Figure 12:
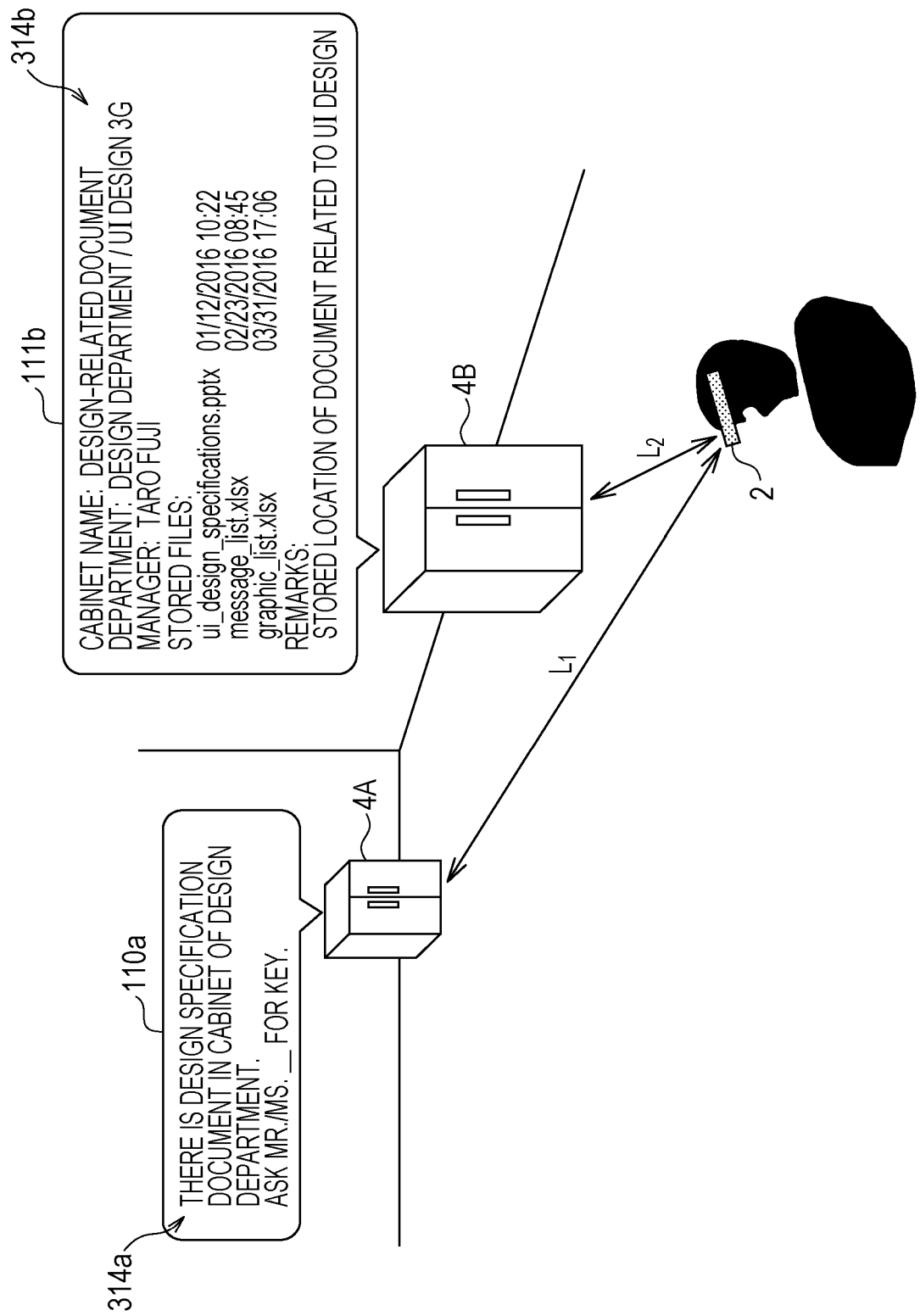
FIG. 12 illustrates another display example of virtual images.

FIG. 12 illustrates another display example of virtual images. As shown in FIG. 12, virtual images with different amounts of information may be virtually displayed in accordance with the distances from the HMD device 2 to the cabinets 4. Specifically, as shown in FIG. 12, a virtual image 110a resembling a digital signage with the smaller amount of information may be virtually displayed for the far-side cabinet 4A, and a virtual image 111b with the larger amount of information than the virtual image 110a may be virtually displayed for the near-side cabinet 4B. The virtual image 110a includes management information 314a. The virtual image 111b includes property information 314b. Although the virtual image 111b displayed at the near-side cabinet 4B has a large amount of information, the virtual image 111b is readable since the distance to the cabinet 4B is short. In the case shown in FIG. 12, the display-image generating unit 303 may generate a display image by changing the text size such that the text size is larger for the cabinet 4 with the longer distance to the HMD device 2 than for the cabinet 4 with the shorter distance to the HMD device 2.

Second Exemplary Embodiment

Figure 13:
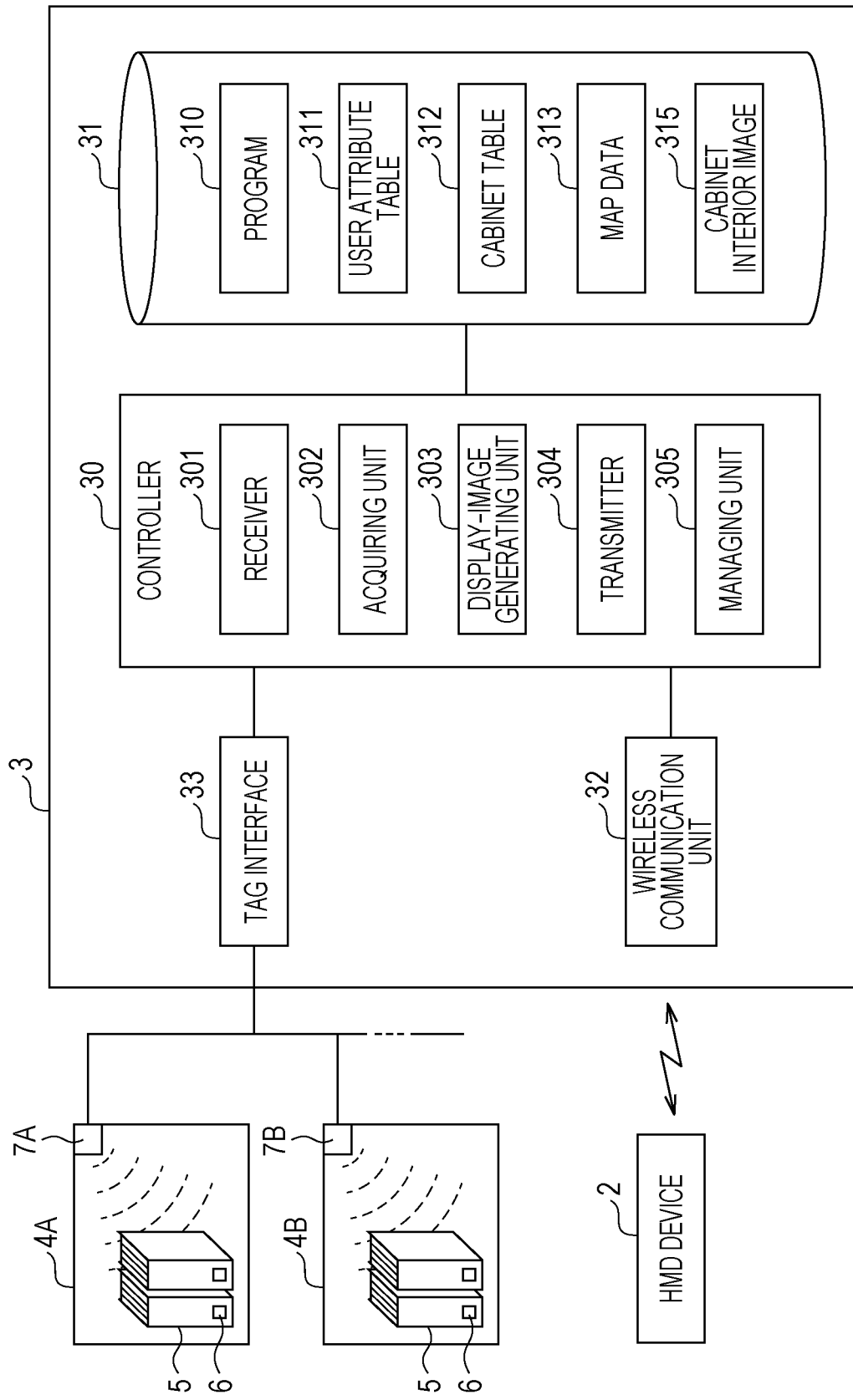
FIG. 13 is a block diagram illustrating an example of a control system of an information processing apparatus according to a second exemplary embodiment of the present invention.

FIG. 13 is a block diagram illustrating an example of a control system of an information processing apparatus according to a second exemplary embodiment of the present invention. In contrast to the first exemplary embodiment in which the cabinet explanatory information 314 is virtually displayed as information related to a contained object, a cabinet interior image 315 is virtually displayed in the second exemplary embodiment. The following description focuses on the differences from the first exemplary embodiment.

Specifically, the storage unit 31 of the information processing apparatus 3 according to this exemplary embodiment stores therein the cabinet interior image 315 in place of the cabinet explanatory information 314. The cabinet interior image 315 is an example of information related to a contained object.

The display-image generating unit 303 generates a display image to be displayed on the display unit 22 of the HMD device 2, such as a display image including the cabinet interior image 315 according to the distance from the HMD device 2 to each cabinet 4.

The cabinet interior image 315 is an image of what may be viewed when the door of the cabinet 4 is opened. The cabinet interior image 315 is stored in the storage unit 31 in association with each cabinet ID.

Figure 14:
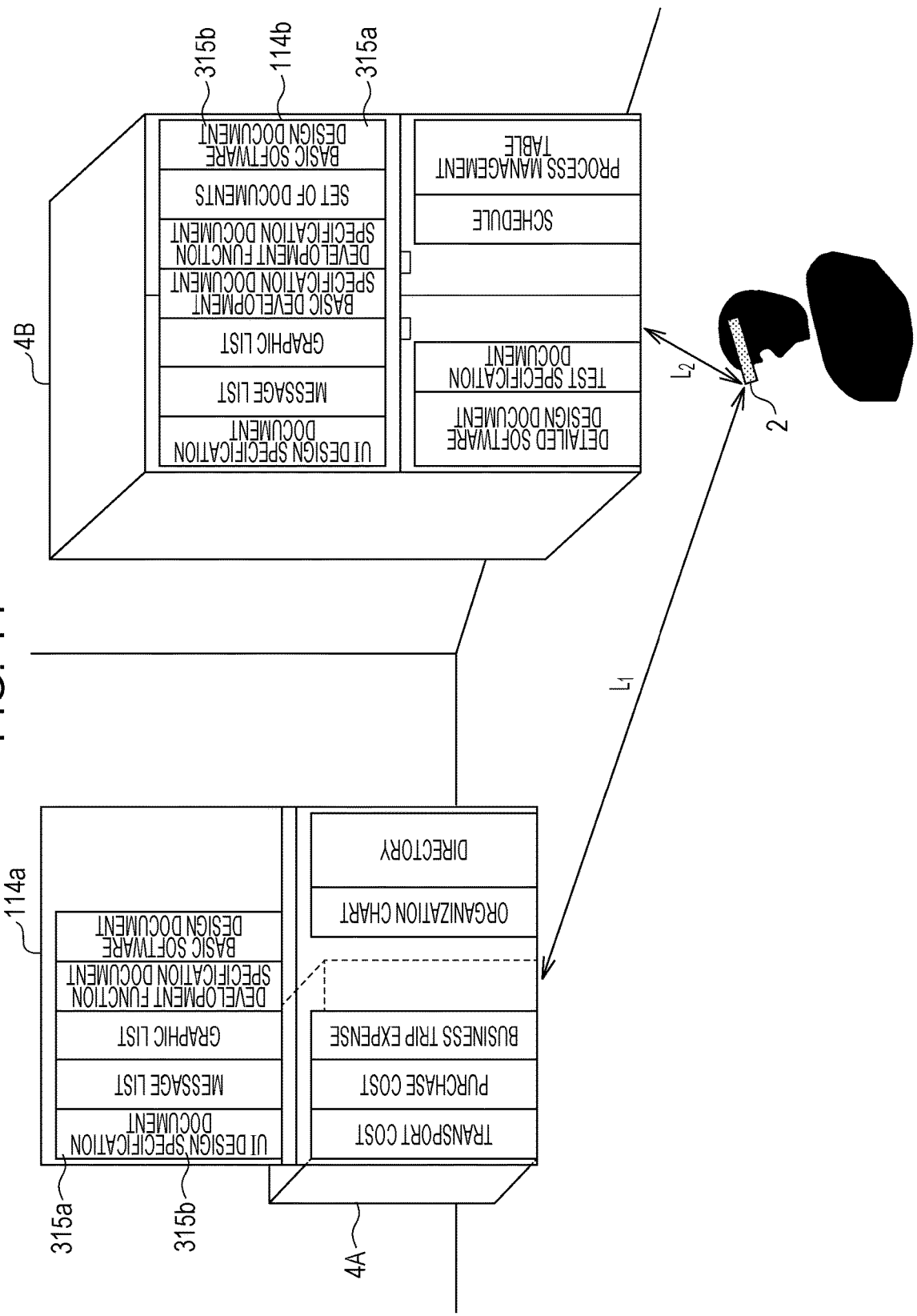
FIG. 14 illustrates a display example of virtual images.

FIG. 14 illustrates a display example of virtual images. FIG. 14 illustrates a state where a virtual image 114a is virtually displayed on the front surface of the far-side cabinet 4A and a virtual image 114b is virtually displayed on the front surface of the near-side cabinet 4B. Each of the virtual images 114a and 114b is a virtually-displayed display image generated based on the cabinet interior image 315. The virtual images 114a and 114b are images of what may be viewed when the doors of the cabinets 4A and 4B are opened, respectively. Specifically, the virtual image 114a includes spines 315a and file names 315b of files 5 contained in the cabinet 4A. The virtual image 114b includes spines 315a and file names 315b of files 5 contained in the cabinet 4B. The virtual images 114a and 114b are two-dimensional images. Although the text of the file names 315b displayed as a virtual image may actually appear to be small in reality as the distance from the HMD device 2 to each cabinet 4 increases, the text is prevented from appearing to be small by changing the text size, thereby achieving better readability of the file names 315b, as compared with a case where the text size is not changed.

The display width of each file name 315b corresponds to the spine width of the actual file 5, and the text of the file name 315b is displayed with a size according to the display width. The colors of the spines 315a or the file names 315b of the files 5 may be changed in accordance with the number of times the actual files 5 are taken out from the cabinets 4. For example, the displayed color may be changed to a brighter color or a highly-visible color as the number of times a file 5 is taken out from the corresponding cabinet 4 increases. This allows a frequently-used file 5 to be readily spotted, as compared with a case where the color thereof is not changed. Alternatively, the spines 315a or the file names 315b of the files 5 may be displayed in a color indicating that the actual files 5 are taken out from the cabinets 4. This readily makes it apparent that a file 5 is taken out from the corresponding cabinet 4. In a case where cabinet IDs and file IDs are stored in association with each other and a file 5 is about to be contained in the wrong cabinet 4, a notification may be provided in accordance with a certain method, such as the display unit 22 of the HMD device 2 displaying a notification that the destination of the file 5 is wrong.

Another Display Example of Virtual Images

Figure 15:
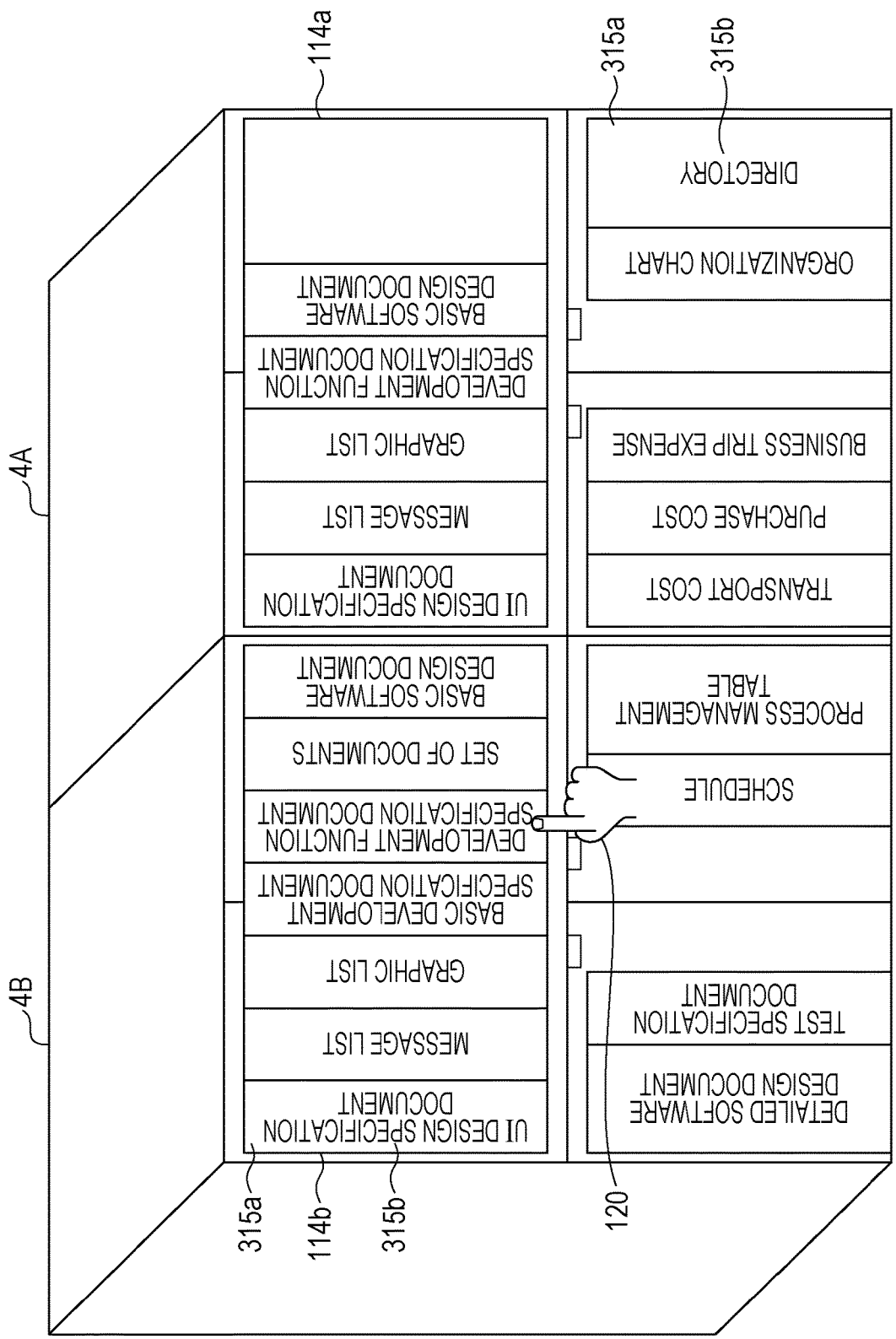
FIG. 15 illustrates another display example of virtual images.

FIG. 15 illustrates another display example of virtual images. FIG. 15 illustrates a state where virtual images 114a and 114b are virtually displayed on the front surfaces of the cabinets 4A and 4B, respectively. The virtual images 114a and 114b are images of what may be viewed when the doors of the cabinets 4A and 4B are opened, respectively. Because the cabinets 4A and 4B are separated from the user using the HMD device 2 by the same distance, the virtual images 114a and 114b are displayed with the same size.

In a case where the user using the HMD device 2 operates the icon 120 to select a file (e.g., spine 315a) included in the virtual image 114b, as described above with reference to FIG. 10, detailed information related to the file 5 may be displayed as a virtual image.

Modification of User Attribute Table

Figure 16:
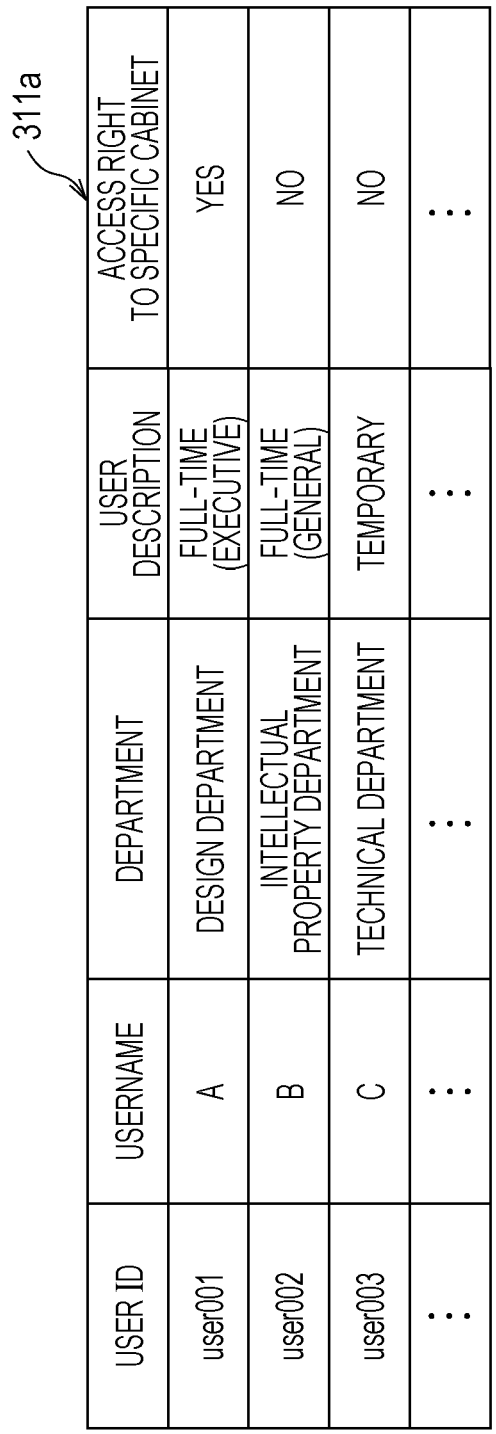
FIG. 16 illustrates a modification of the user attribute table.

FIG. 16 illustrates a modification of the user attribute table. A user attribute table 311a shown in FIG. 16 is obtained by adding an "access right to specific cabinet" field to the user attribute table 311 shown in FIG. 5. In the "access right to specific cabinet" field, information indicating whether or not there is an access right to a specific cabinet is recorded.

In this case, in the "cabinet ID" field of the cabinet table 312 shown in FIG. 6, an ID having the character "C" at the head may be added in a case of a normal cabinet 4, and the character "S" may be added to the head of a normal ID in a case of a specific cabinet 4 that may require an access right. Accordingly, it is clear whether or not a corresponding cabinet 4 is a specific cabinet 4 in accordance with a cabinet ID.

In a case where a cabinet 4 included in an image is a specific cabinet 4, the acquiring unit 302 refers to the user attribute table 311a shown in FIG. 16 so as to determine whether or not a user using the HMD device 2 has an access right to the specific cabinet 4 based on a user ID.

The display-image generating unit 303 generates a display image in accordance with whether or not the user has an access right. If the user has no access right, a display image does not have to be generated. In the case shown in FIG. 15, if the user using the HMD device 2 operates the icon 120 to select a file (e.g., spine 315a) included in the virtual image 114b, as described above with reference to FIG. 10, the detailed information related to the file 5 may be displayed as a virtual image only if the user using the HMD device 2 has an access right to the cabinet 4B.

Each cabinet 4 may have a door and a lock controller that unlocks the door if the user using the HMD device 2 has an access right to the cabinet 4. In this case, the acquiring unit 302 of the information processing apparatus 3 determines whether or not the user has an access right based on the user attribute table 311a, and notifies the lock controller of the determination result, thereby eliminating a locking process to be performed by the manager.

Although the exemplary embodiments of the present invention have been described above, the exemplary embodiments of the present invention are not limited to the above exemplary embodiments, and various modifications are permissible within the scope of the invention. For example, although a light-transmissive head-mounted display device is described as a display device in each exemplary embodiment, an exemplary embodiment of the present invention may be similarly applied to a portable information terminal, such as a smartphone that displays a display image as a virtual image on a photographed image of the real space (background) in an overlapping manner.

Furthermore, at least one of the functions of the information processing apparatus 3 may be transferred to the HMD device 2, and at least one of the functions of the HMD device 2 may be transferred to the information processing apparatus 3. For example, the voice recognition function of the HMD device 2 may be transferred to the information processing apparatus 3, such that a voice signal is transmitted from the HMD device 2 to the information processing apparatus 3 and is converted into voice data by using the voice recognition function of the information processing apparatus 3.

Each of the components included in the controllers 20 and 30 may be partially or entirely constituted of a hardware circuit, such as a field programmable gate array (FPGA) or an application specific integrated circuit (ASIC).

One or some of the components in each of the above exemplary embodiments may be omitted or changed within the scope of the invention. Furthermore, in the flowchart in each of the above exemplary embodiments, for example, a step or steps may be added, deleted, changed, or interchanged within the scope of the invention. Moreover, the program used in each of the above exemplary embodiments may be provided by being recorded on a computer readable recording medium, such as a compact disc read-only memory (CD-ROM). Alternatively, the program used in each of the above exemplary embodiments may be stored in an external server, such as a cloud server, and may be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acquiring unit that acquires positional information of a container containing a contained object from an image acquired as a result of photographing the container by using a display device that displays a virtual-space image and a real space in an overlapping manner and that has a photographing function; and
a command unit that commands the display device to display information related to the contained object stored in association with the positional information as the virtual-space image near the container,
wherein the contained object is a file that binds a document, and
wherein the information related to the contained object is a file name displayed on a spine of the file.

2. The information processing apparatus according to claim 1,
wherein the command unit makes a command to change the information related to the contained object based on a command from the display device.

3. The information processing apparatus according to claim 2,
wherein the command unit makes a command to display attribute information of selected information based on the command from the display device.

4. The information processing apparatus according to claim 3,
wherein displaying of the attribute information is limited by an access right given to a user using the display device.

5. The information processing apparatus according to claim 1,
wherein the information related to the contained object includes contents according to an access right given to a user using the display device.

6. The information processing apparatus according to claim 1,
wherein the information related to the contained object is changed in accordance with a predetermined time.

7. The information processing apparatus according to claim 1,
wherein the file name is displayed with a display width having a size corresponding to a spine width of the file, and text of the file name is displayed with a size according to the display width.

8. The information processing apparatus according to claim 1,
wherein a color the file is changed in accordance with a number of times the file is actually taken out from the container.

9. The information processing apparatus according to claim 1,
wherein the file is displayed in a color indicating that the file is actually taken out from the container.

10. The information processing apparatus according to claim 1,
wherein the container includes a door and a lock controller that unlocks the door if a user has an access right to the container.

11. An information processing apparatus comprising:
an acquiring unit that acquires positional information of a container containing a contained object from an image acquired as a result of photographing the container by using a display device that displays a virtual-space image and a real space in an overlapping manner and that has a photographing function; and
a command unit that commands the display device to display information related to the contained object stored in association with the positional information as the virtual-space image near the container,
wherein the acquiring unit acquires a distance between the display device and the container, and
wherein the command unit makes a command to display the information related to the contained object by changing a text size of the information such that the text size is larger for the container with a longer distance to the display device than the container with a shorter distance to the display device.

12. An information processing apparatus comprising:
an acquiring unit that acquires positional information of a container containing a contained object from an image acquired as a result of photographing the container by using a display device that displays a virtual-space image and a real space in an overlapping manner and that has a photographing function; and
a command unit that commands the display device to display information related to the contained object stored in association with the positional information as the virtual-space image near the container,
wherein the command unit makes a command to display a notification in a case where the container and the contained object are associated with each other and the contained object is taken out or if the contained object is to be contained in a wrong container.

13. An information processing apparatus comprising:
an acquiring unit that acquires positional information of a container containing a contained object from an image acquired as a result of photographing the container by using a display device that displays a virtual-space image and a real space in an overlapping manner and that has a photographing function; and
a command unit that commands the display device to display information related to the contained object stored in association with the positional information as the virtual-space image near the container,
wherein if a photographed image of the container and a log-in request are received from the display device, the command unit makes a command to display the information related to the contained object as the virtual-space image, and wherein if no command is made for a predetermined time or if no log-out request is received, the command unit makes a command to end the displaying of the information related to the contained object as the virtual-space image.

14. An information processing system comprising:
a display device that displays a virtual-space image and a real space in an overlapping manner and that has a photographing function;
an acquiring unit that acquires positional information of a container containing a contained object from an image acquired as a result of the display device photographing the container; and
a command unit that commands the display device to display information related to the contained object stored in association with the positional information as the virtual-space image near the container,
wherein the contained object is a file that binds a document, and
wherein the information related to the contained object is a file name displayed on a spine of the file.

15. A non-transitory computer readable medium storing a program causing a computer to execute a process for processing information, the process comprising:
acquiring positional information of a container containing a contained object from an image acquired as a result of photographing the container by using a display device that displays a virtual-space image and a real space in an overlapping manner and that has a photographing function; and
commanding the display device to display information related to the contained object stored in association with the positional information as the virtual-space image near the container,
wherein the contained object is a file that binds a document, and
wherein the information related to the contained object is a file name displayed on a spine of the file.

* * * * *